(12) United States Patent
Yokokura et al.

(10) Patent No.: US 11,498,606 B2
(45) Date of Patent: Nov. 15, 2022

(54) STEERING DEVICE

(71) Applicant: YAMADA MANUFACTURING CO., LTD., Kiryu (JP)

(72) Inventors: Yasushi Yokokura, Kiryu (JP); Kazuya Akaishi, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 17/566,002

(22) Filed: Dec. 30, 2021

(65) Prior Publication Data

US 2022/0234646 A1    Jul. 28, 2022

(30) Foreign Application Priority Data

Jan. 27, 2021  (JP) .............................. JP2021-011255

(51) Int. Cl.
  *B62D 1/184*  (2006.01)
  *B62D 1/19*   (2006.01)
  *B62D 1/187*  (2006.01)
  *B62D 1/185*  (2006.01)

(52) U.S. Cl.
  CPC ............. *B62D 1/184* (2013.01); *B62D 1/185* (2013.01); *B62D 1/187* (2013.01); *B62D 1/195* (2013.01)

(58) Field of Classification Search
  CPC .................................. B62D 1/187; B62D 1/184
  See application file for complete search history.

(56) References Cited

U.S. PATENT DOCUMENTS

| 8,590,932 B2 * | 11/2013 | Dietz ................... B60R 21/09 |
|  |  | 280/775 |
| 9,969,420 B2 * | 5/2018 | Ishii ..................... B62D 1/184 |
| 11,279,393 B2 * | 3/2022 | Jacobs .................. B62D 1/184 |

FOREIGN PATENT DOCUMENTS

| CN | 107002839 A | * | 8/2017 | ............. B23P 15/00 |
| CN | 112298331 A | * | 2/2021 |  |
| EP | 3138757 A1 | * | 3/2017 | ............. B62D 1/184 |
| EP | 3666624 A1 | * | 6/2020 | ............. B62D 1/184 |
| EP | 3812242 A1 | * | 4/2021 |  |
| JP | 2009-196436 | | 9/2009 |  |
| WO | WO-2012035891 A1 | * | 3/2012 | ............. B62D 1/184 |
| WO | WO-2015119000 A1 | * | 8/2015 | ............. B62D 1/184 |

* cited by examiner

*Primary Examiner* — Drew J Brown
(74) *Attorney, Agent, or Firm* — Rankin, Hill & Clark LLP

(57) ABSTRACT

In a steering device according to an aspect of the present disclosure, a driven cam includes a lock position restriction surface with which a cam portion of a drive cam engages in a locked state and a release position restriction surface that is provided to be separated front the lock position restriction surface in a bolt circumferential direction and that engages with the drive cam in the bolt circumferential direction in an unlocked state. The cam portion includes a sliding surface that faces the driven cam in the unlocked state and a flank surface that faces the release position restriction surface in the bolt circumferential direction. The angle of the flank surface with respect to the bolt circumferential direction is smaller than the angle of the release position restriction surface with respect to the bolt circumferential direction.

7 Claims, 10 Drawing Sheets

STEERING DEVICE

BACKGROUND OF THE INVENTION

Field of the Invention

The present disclosure relates to a steering device.
Priority is claimed on Japanese Patent Application No. 2021-011255, filed on Jan. 27, 2021, the content of which is incorporated herein by reference.

Description of Related Art

In some cases, a steering device has a tilt function. The tilt function is a function of adjusting the angle of inclination of a steering shaft (the angle of inclination with respect to a horizontal plane) in accordance with a difference in body size between drivers or a driving posture. In the steering device, the steering shaft is held by a column unit so as to be rotatable around an axis extending along a front-rear direction. A front end portion of the column unit is supported by a front bracket so as to be rotatable around an axis extending along a right-left direction. A rear end portion of the column unit is supported by a rear bracket via a rod. Specifically, a tilt guide hole that extends in a vertical direction is formed in the rear bracket. In the case of the steering device, the angle of inclination of the column unit (steering shaft) is adjusted with the rod moving upward or downward in the tilt guide hole due to rotation with respect to the front bracket.

A lock mechanism is installed in the steering device having the tilt function. The lock mechanism switches between a locked state in which rotation of the column unit with respect to the front bracket is restricted and an unlocked state in which the rotation of the column unit with respect to the front bracket is allowed. For example, Japanese Unexamined Patent Application, First Publication No. 2009-196436 discloses a configuration including a drive cam fixed to a rod and a driven cam held by a rear bracket as a lock mechanism. The driven cam is prevented from rotating with respect to the rear bracket by an engagement protrusion portion held in the tilt guide hole.

According to this configuration, as the rod rotates, the drive cam and the driven cam rotate relative to each other while sliding on each other such that the distance between the drive cam and the driven cam is increased or decreased. At this time, when the distance between the drive cam and the driven cam is increased, the column unit is fastened by the rear bracket. As a result, the steering device enters the locked state. When the distance between the drive cam and the driven cam is decreased, the column unit fastened by the tear bracket is loosened. As a result, the steering device enters the unlocked stale.

Meanwhile, the above-described driven cam is caused to rotate by an amount corresponding to a gap between an inner peripheral edge of the tilt guide hole and an outer peripheral surface of the engagement protrusion portion at the lime of a switch between the locked state and the unlocked state of the lock mechanism due to a frictional force or the like acting between the drive cam and the driven cam. At this time, the engagement protrusion portion collides with the inner peripheral edge of the tilt guide hole as the driven cam rotates and thus an impression may be formed on the inner peripheral edge of the tilt guide hole. In a case where the column unit is moved upward or downward with the impression formed on the inner peripheral edge of the tilt guide hole, the engagement protrusion portion may be caught at the impression when the engagement protrusion portion passes by the impression. As a result, an abnormal noise is generated at the time of adjustment of a tilt position or a user feels a sense of wrongness.

Generally, a configuration in which an engagement surface formed on the drive cam and a restriction surface formed on the driven cam are caused to come into surface contact with each other in a circumferential direction in the unlocked state is adopted to restrict relative movement of the drive cam and the driven cam in the circumferential direction.

However, in the case of a configuration in which the engagement surface and the restriction surface are caused to come into surface contact with each other, the position of contact between the engagement surface and the restriction surface may fluctuate due to slight manufacturing variability of the drive cam or the driven earn. In a case where the area of contact between the engagement surface and the restriction surface becomes small, a large load may act between the engagement protrusion portion and the inner peripheral edge of the tilt guide hole via the restriction surface. As a result, an impression may be formed on the inner peripheral edge of the tilt guide hole as described above.

SUMMARY OF THE INVENTION

The present disclosure provides a steering device with which it is possible to provide a favorable operational feeling to a user regardless of manufacturing variability.

(1) A steering device according to an aspect of the present disclosure includes: a column unit configured to support a steering shaft such that the steering shaft is rotatable around a first axis extending along a front-rear direction; a front bracket that is attached to a vehicle body in a state of supporting the column unit such that the column unit is rotatable around a second axis extending along a right-left direction; a rear bracket that includes side plate portions and is attached to the vehicle body behind the front bracket, the side plate portions being positioned on both sides in the right left direction with respect to the column unit and being provided with tilt guide holes each extending in an arc shape centered on the second axis; and a lock mechanism configured to switch between a locked state in which the column unit is restricted from moving around the second axis with respect to the front bracket and an unlocked state in which the column unit is allowed to move around the second axis with respect to the front bracket. The lock mechanism includes a rod that is supported by the column unit so as to lie rotatable around a third axis extending along the right-left direction in a state of penetrating the column unit and the tilt guide holes in the right-left direction, a drive cam that includes a cam portion and is fixed to the rod, and a driven cam that includes a holding portion held in the tilt guide hole and a cam follower portion facing the cam portion in the right-left direction outside the tilt guide hole and sliding on the cam portion as the rod rotates. One of the cam portion and the cam follower portion includes a lock, position restriction surface that engages with the other of the cam portion and the cam follower portion in the locked state and a release position restriction surface that is provided to be separated from the lock position restriction surface in a circumferential direction around the third axis and engages with the other of the cam portion and the cam follower portion in the unlocked state. The release position restriction surface is an inclined surface that extends to be closer to the other of the cam portion and the earn follower portion in the right-left direction as the inclined extends away from the lock position restriction surface in the circumferential direction, the other of the cam portion and the cam follower portion includes a top surface that faces the one of the cam portion and the cam follower portion in the right-left direction and a first side surface that is connected to the top surface and faces the release position restriction surface in the circumferential direction. The angle of the first side surface with respect to the circumferential direction is smaller than the angle of the release position restriction surface with respect to the circumferential direction.

During a transition from the locked state to the unlocked state of the lock mechanism, the holding portion is caused to rotate by an amount corresponding to a gap between the inner peripheral edge of the tilt guide hole and an outer peripheral surface of the holding portion. Accordingly, the holding portion is pressed against the inner peripheral edge of the tilt guide hole via the release contact portion.

Therefore, according to the aspect, a configuration in which the angle of the first side surface with respect to the circumferential direction is smaller than that of the angle of the release posit ion restriction surface with respect to the circumferential direction is adopted. Accordingly, a ridge portion between the top surface and the first side surface of the one of the cam portion and the cam follower portion is likely to come into line contact with the release position restriction surface in the unlocked state. Accordingly, in the case of the steering device according to the aspect, manufacturing variability is less likely to exert an influence in comparison with a case where the other of the cam portion and the cam follower portion and the release position restriction surface are caused to come into surface contact with each other in the circumferential direction. Therefore, a load acting between the cam portion and the cam follower portion can be stabilized.

Furthermore, with the steering device according to the aspect, the angle of the release position restriction surface with respect to the bolt circumferential direction can be made larger in comparison with a case where the other of the cam portion and the cam follower portion and the release position restriction surface are caused to come into surface contact with each other in the circumferential direction. Therefore, with the steering device according to the aspect, a load component in the circumferential direction, which is a part of a load acting in the normal direction of the release position restriction surface at a contact portion between the ridge portion and the release position restriction surface, can be made small (a load component in the right-left direction can be made large). As a result, with the steering device according to the aspect, a surface pressure acting bet ween the holding portion and the inner peripheral edge of the tilt guide hole can be stabilized and thus it is possible to suppress an impression or the like formed on the inner peripheral edge of the tilt guide hole. Accordingly, with the steering device according to the aspect, generation of an abnormal noise or a sense of wrongness felt by a user can be reduced even in a ease where the holding portion slides on the inner peripheral edge of the tilt guide hole at the time of a change in tilt position. Therefore, it is possible to provide a favorable operational feeling to a user.

(2) In the steering device according to the aspect (1), it is preferable that the other of the cam portion and the cam follower portion is configured to be rideable on the release position restriction surface in the unlocked state.

According to the aspect, the position of contact between the release position restriction surface and the ridge portion can be stabilized in the unlocked state. Therefore, with the steering device according to the aspect, wobbling between the drive cam and the driven cam in the unlocked state can be suppressed.

(3) In the steering device according to the aspect (1) or (2), the lock position restriction surface may be an inclined surface that extends to be closer to the other of the cam portion and the cam follower portion in the right-left direction as the inclined extends away front the release position restriction surface in the circumferential direction and of which the angle with respect to the circumferential direction is smaller than that of the release position restriction surface. The other of the cam portion and the cam follower portion may include a second side surface that is connected to the top surface and abuts the lock position restriction surface in the locked state.

According to the aspect, a load component in the circumferential direction, which is a part of a load acting in the normal direction of the lock position restriction surface at a contact portion between the second side surface and the lock position restriction surface in die locked state, can be made large. Accordingly, with the steering device according to the aspect, the holding portion can be reliably pressed against the inner peripheral edge of the tilt guide hole. As a result, with the steering device according to the aspect, it is possible to secure a frictional force acting between the holding portion and the inner peripheral edge of the tilt guide hole in the locked state and thus it is possible to suppress unexpected vertical movement of the column unit.

(4) In the steering device according to any one of the aspects (1) to (3), the driven cam may include a base portion that is positioned outside the tilt guide hole and on which the cam follower portion is formed. An indication portion used to determine an attachment orientation of the holding portion around the third axis may be provided at a portion of the base portion in the circumferential direction.

According to the aspect, the attachment orientation of the driven cam can be easily made the same between steering devices. Therefore, with the steering device according to the aspect, it is possible to restrain conditions of contact between the holding portion (the release contact portion and the lock contact portion) and the inner peripheral edge of the tilt guide hole from being different between steering devices due to manufacturing variability of the driven cam. As a result, it is possible to suppress a variation in performance of the lock mechanism.

According to each of the aspects, it is possible to provide a favorable operational feeling to a user regardless of manufacturing, variability.

DETAILED DESCRIPTION OF THE INVENTION

Figure 1:
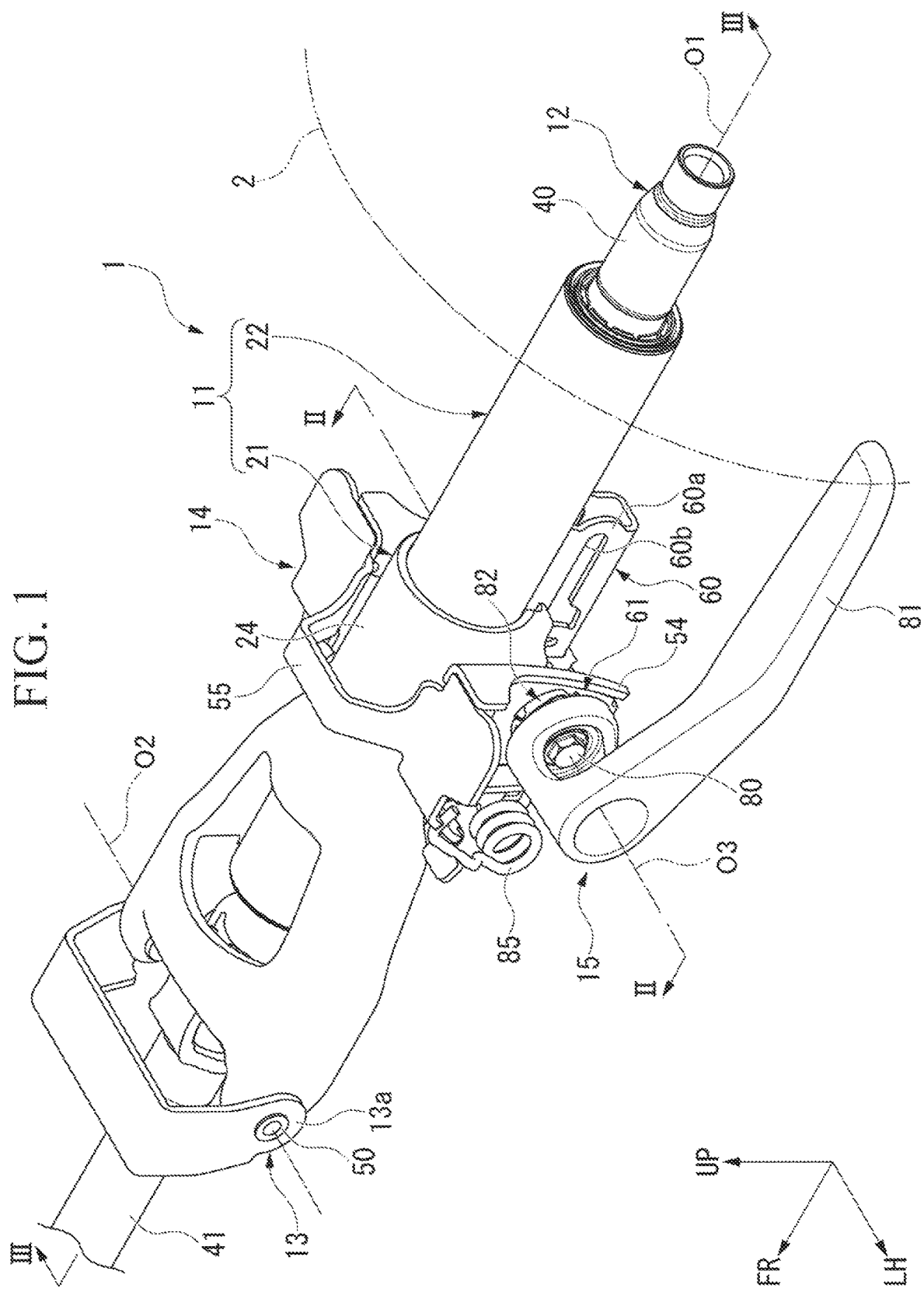
FIG. 1 is a perspective view of a steering device according to an embodiment.

Next, an embodiment of the present disclosure will be described with reference to the drawings. In the embodiment and a modification example which will be described below, the corresponding configurations may be given the same reference numerals and the description thereof may be omitted. Note that in the following description, for example, an expression of relative or absolute arrangement such as "parallel", "orthogonal", "centered", and "coaxial" shall not be construed as indicating only the arrangement in a strict literal sense, but also includes a state where the arrangement is relatively displaced by a tolerance, or by the angle or the distance whereby it is possible to achieve the same function,

[Steering Device 1]

FIG. 1 is a perspective view of a steering device 1.

As shown in FIG. 1, the steering device 1 is installed in a vehicle. The steering device 1 adjusts the steering angles of wheels as a steering wheel 2 is rotated.

The steering device 1 includes a column unit 11, a steering shaft 12, brackets (a from bracket 13 and rear bracket 14), and an adjustment mechanism 15. Each of the column unit 11 and the steering shaft 12 is formed in a tubular shape disposed on a first axis O1. Therefore, in the following description, a direction in which the first axis O1 of the column unit 11 and the steering shaft 12 extends may be simply referred to as a shaft axial direction, a direction orthogonal to the first axis O1 may be referred to as a shaft radial direction, and a direction around the first axis O1 may be referred to as a shaft circumferential direction.

The steering device 1 of the present embodiment is installed in the vehicle in a state where the first axis O1 is inclined with respect to a front-rear direction. Specifically, the first axis O1 of the steering device 1 extends to be closer to an upper side toward a rear side. In the following description, for the sake of convenience, in the steering device 1, a direction toward the steering wheel 2 in the shaft axial direction will be simply referred to as a rearward direction, and a direction toward a side opposite to the steering wheel 2 will be simply referred to as a frontward direction tan arrow FR). Of the shaft radial directions, a vertical direction in a state where the steering device 1 is attached to the vehicle will be simply referred to as a vertical direction (an arrow UP represents an upward direction) and a right-left direction wall be simply referred to as a right-left direction.

<Column Unit 11>

Figure 2:
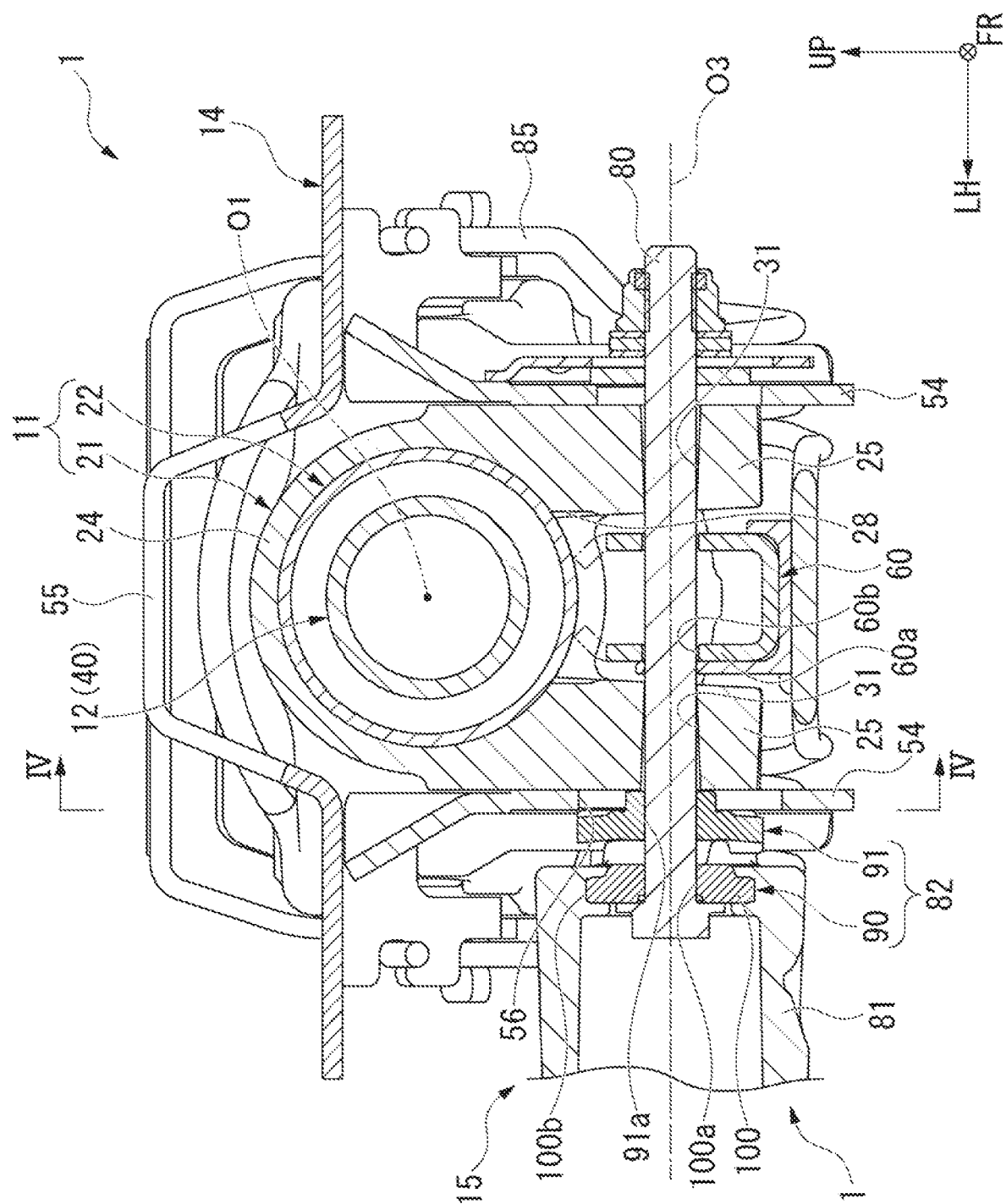
FIG. 2 is a cross-sectional view corresponding to line II-II of FIG. 1.

FIG. 2 is a cross-sectional view taken along line II-II of FIG. 1.

As shown in FIGS. 1 and 2, the column unit 11 includes an outer column 21 and an inner column 22.

The outer column 21 is attached to a vehicle body via the brackets 13 and 14. The outer column 21 includes a holding tubular portion 24 and fastening portions 25.

The holding tubular portion 24 is formed in a tubular shape extending along the first axis O1. A slit 28 is formed at a portion in the shaft circumferential direction (in the present embodiment, a lower portion of the outer column 21) of a rear portion of the holding tubular portion 24. The slit 28 penetrates the outer column 21 in the shaft radial direction and is open at a rear end surface of the outer column 21.

As shown in FIG. 2, the fastening portions 25 of the holding tubular portion 24 extend downward from positions facing each other in the right-left direction with the slit 28 interposed therebetween. Through-holes 31 that penetrate the fastening portions 25 in the right-left direction are formed in the fastening portions 25.

Figure 3:
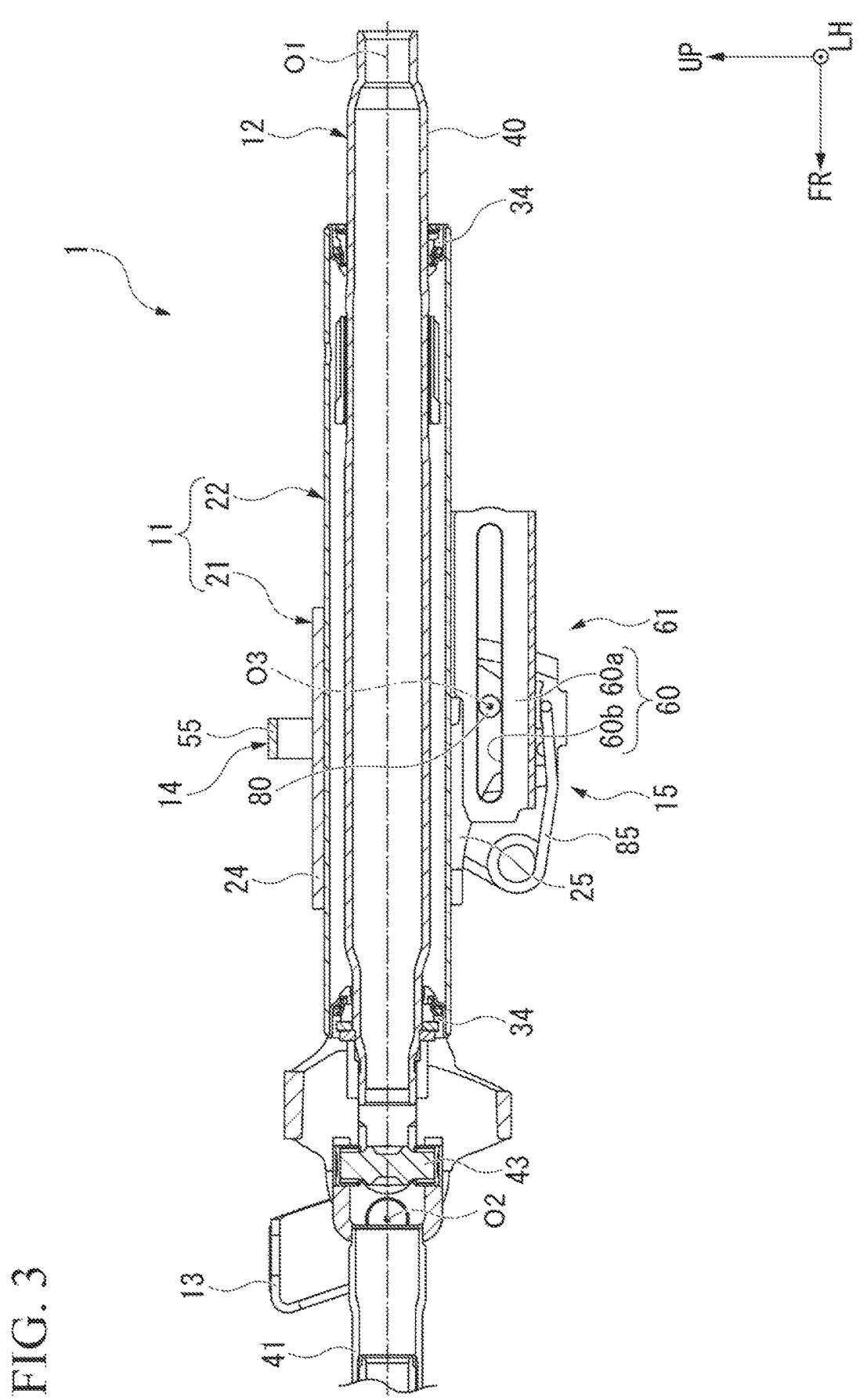
FIG. 3 is a cross-sectional view corresponding to line III-III of FIG. 1.

FIG. 3 is a cross-sectional view taken along line III-III of FIG. 1.

As shown in FIG. 3, the inner column 22 is formed in a tubular shape extending along the first axis O1. The outer diameter of the inner column 22 is smaller than the inner diameter of the holding tubular portion 24. The inner column 22 is inserted into the holding tubular portion 24. The inner column 22 is configured to be movable in the shaft axial direction with respect to the holding tubular portion 24. In the inner column 22, a bearing 34 is attached to each of a front end portion and a rear end portion by being press-fitted or the like.

<Steering Shaft 12>

The steering shaft 12 includes a rear shaft 40 and a front shaft 41. The rear shaft 40 is inserted into the inner column 22. The rear shaft 40 is supported in the inner column 22 via the bearings 34 so as to be rotatable around the first axis O1. A rear end port ion of the rear shaft 40 protrudes rearward through a rear end opening portion of the inner column 22. The steering wheel 2 (refer to FIG. 1) is connected to the rear end portion of the rear shaft 40.

The front shaft 41 is connected to a front end portion of the rear shaft 40 via a first universal joint 43. That is, the front shaft 41 is configured to be swingable with respect to the rear shaft 40. The front end portion of the front shaft 41 is connected to a steering gearbox (not shown) via a second universal joint (not shown). In the case of the steering device 1, the wheels are steered when a rotational force of the steering shaft 12 is transmitted to the steering gear box, <Brackets 13 and 14>

As shown in FIG. 1, the front bracket 13 connects the outer column 21 and the vehicle body to each other via a pivot shaft 50. The front bracket 13 is formed in a U-like shape that is open to a lower side in a front view as seen in the shaft axial direction. The front bracket 13 surrounds the rear end portion of the outer column 21 on an upper side and both sides in the right left direction. Front side plate portions 13a of the front bracket 13, which are positioned on both sides in the right-left direction, are connected to a front end portion of the outer column 21 via the pivot shaft 50. The outer column 21 is supported by the front bracket 13 so as to be rotatable around a second axis O2 that extends in the right-left direction about the pivot shaft 50.

The rear bracket 14 connects the outer column 21 and the vehicle body to each other via a lock bolt (rod) 80. The rear bracket 14 is formed in a U-like shape that is open to the lower side in the front view as seen in the shaft axial direction. The rear bracket 14 surrounds the outer column 21 on the upper side and both sides in the right-left direction. Specifically, the rear bracket 14 includes rear side plate portions (side plate portions) 54 disposed on the right and left sides with respect to the column unit 11 and a bridge portion 55 that connects the rear side plate portions 54 to each other.

Figure 4:
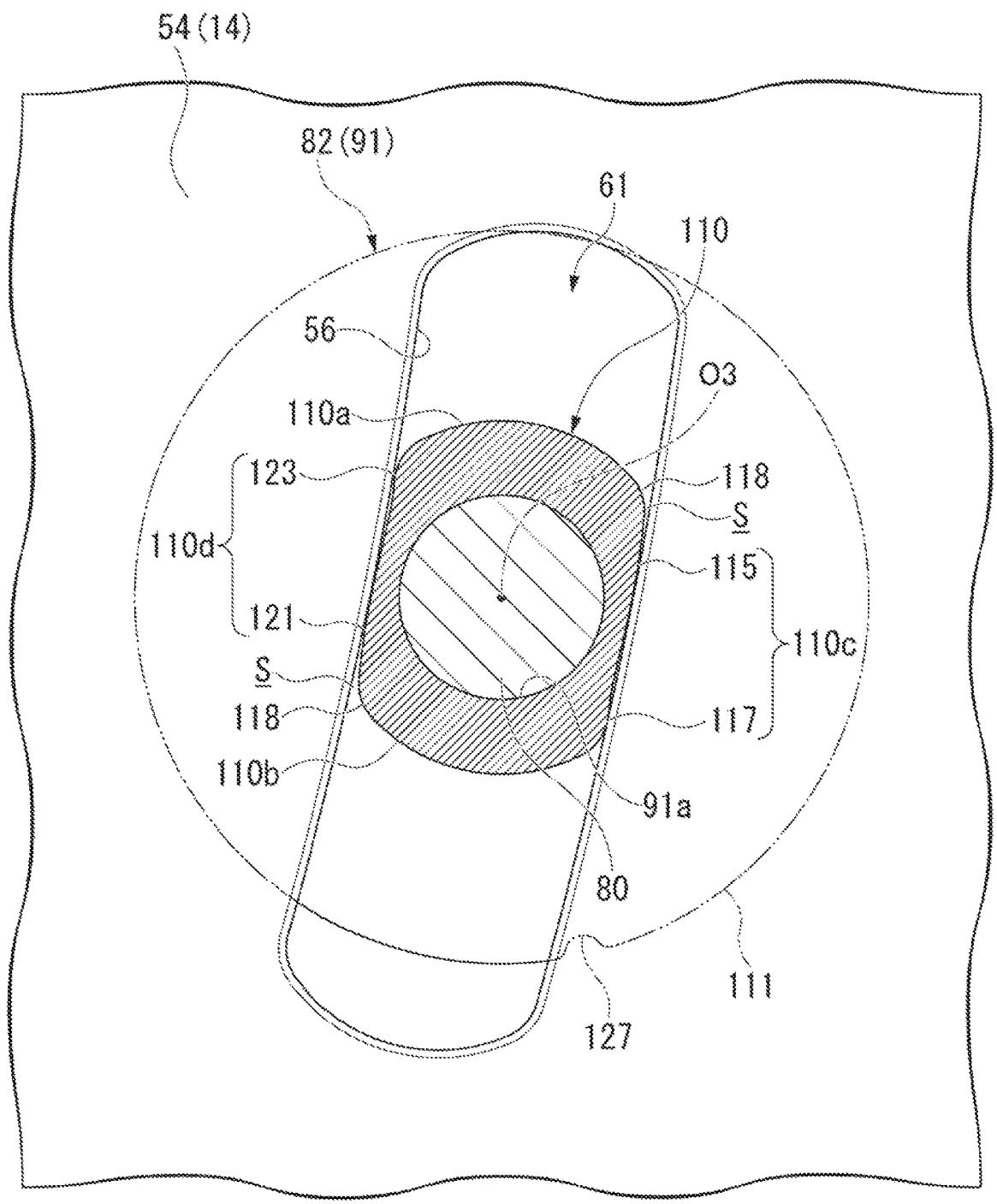
FIG. 4 is a cross-sectional view corresponding to line IV-IV of FIG. 2.

FIG. 4 is a cross-sectional view corresponding to line IV-IV of FIG. 2.

As shown in FIG. 4, a tilt guide hole 56 that penetrates each rear side plate portion 54 in the right-left direction is formed in each rear side plate portion 54. The tilt guide hole 56 is an elongated hole extending in the vertical direction. Specifically, the tilt guide hole 56 is formed in an arc shape of which the center of curvature is the second axis O2 and that is curved rearward. The lock holt 80 penetrates the tilt guide holes 56 in the right-left direction. That is, the lock bolt 80 moves upward and downward in the tilt guide holes 56 when the column unit 11 is tilted tat the time of adjustment of the angle of the column unit 11 around the second axis O2).

As shown in FIGS. 1 and 2, the bridge portion 55 connects upper end portions of the rear side plate portions 54 to each other. The bridge portion 55 is formed in an arch like shape that protrudes upward. The bridge portion 55 is positioned on the rotation locus of the column unit 11 when the column unit 11 is lilted. That is, when the column unit 11 is tilted, the column unit 11 approaches the bridge portion 55 from below or is separated from the bridge portion 55.

<Adjustment Mechanism 15>

The adjustment mechanism 15 adjusts the position (the telescopic position) of the inner column 22 (and the steering shaft 12) with respect to the outer column 21 in the front-rear direction and the position (the tilt position) of the column unit 11 with respect to the front, bracket 13 in a direction around the second axis O2. Specifically, the adjustment mechanism 15 includes a hanger bracket 60 and a lock mechanism 61.

The hanger bracket 60 is downwardly fixed to an outer peripheral surface of the inner column 22. The hanger bracket 60 is formed by, for example, performing press work on a metal plate. The hanger bracket 60 is formed in a U-like shape that is open to an upper side as seen in the front view. The hanger bracket 60 includes a pair of facing wall portions 60a facing each other in the right-left direction. Upper end edges of the facing wall portions 60a are fixed to the inner column 22 through welding or the like.

The hanger bracket 60 is exposed to the outside of the holding tubular portion 24 through the slit 28 of the holding tubular portion 24. Telescopic guide holes 60b are formed in the facing wall portions 60a. The telescopic guide holes 60b are elongated holes of which the longitudinal direction is the shaft axial direction. A portion of each telescopic guide hole 60b in the shaft axial direction overlaps with the through holes 31 as seen in the right-left direction.

The lock mechanism 61 includes the lock bolt 80, an operation lever 81, and a cam mechanism 82.

The lock bolt 80 penetrates the rear side plate portions 54, the fastening portions 25, and the hanger bracket 60 in the right-left direction through the tilt guide holes 56, the through-holes 31, and the telescopic guide holes 60b. At the time of a telescopic operation, the lock bolt 80 moves forward and backward in the telescopic guide holes 60b such that the inner column 22 moves forward and backward. At the time of a tilting operation, the lock bolt 80 moves upward and downward together with the column unit 11 by moving upward and downward in the tilt guide holes 56. In the following description, a direction orthogonal to a third axis O3 may be referred to as a bolt radial direction and a direction around the third axis O3 may be referred to as a bolt circumferential direction.

An urging member 85 is interposed between the lock bolt 80 and the hanger bracket 60. The urging member 85 is, for example, a double torsion spring. The urging member 85 urges the column unit 11 upward via the hanger bracket 60.

The operation lever 81 extends rearward from the lock bolt 80 in a cantilevered state. Specifically, a base end portion (a front end portion) of the operation lever 81 is connected to a left side end portion (a second side end portion in the right-left direction) of the lock bolt 80. The operation lever 81 is configured to be rotatable around the third axis O3 together with the lock bolt 80 by being pressed down or pulled up via a tip end portion fa rear end portion).

Figure 5:
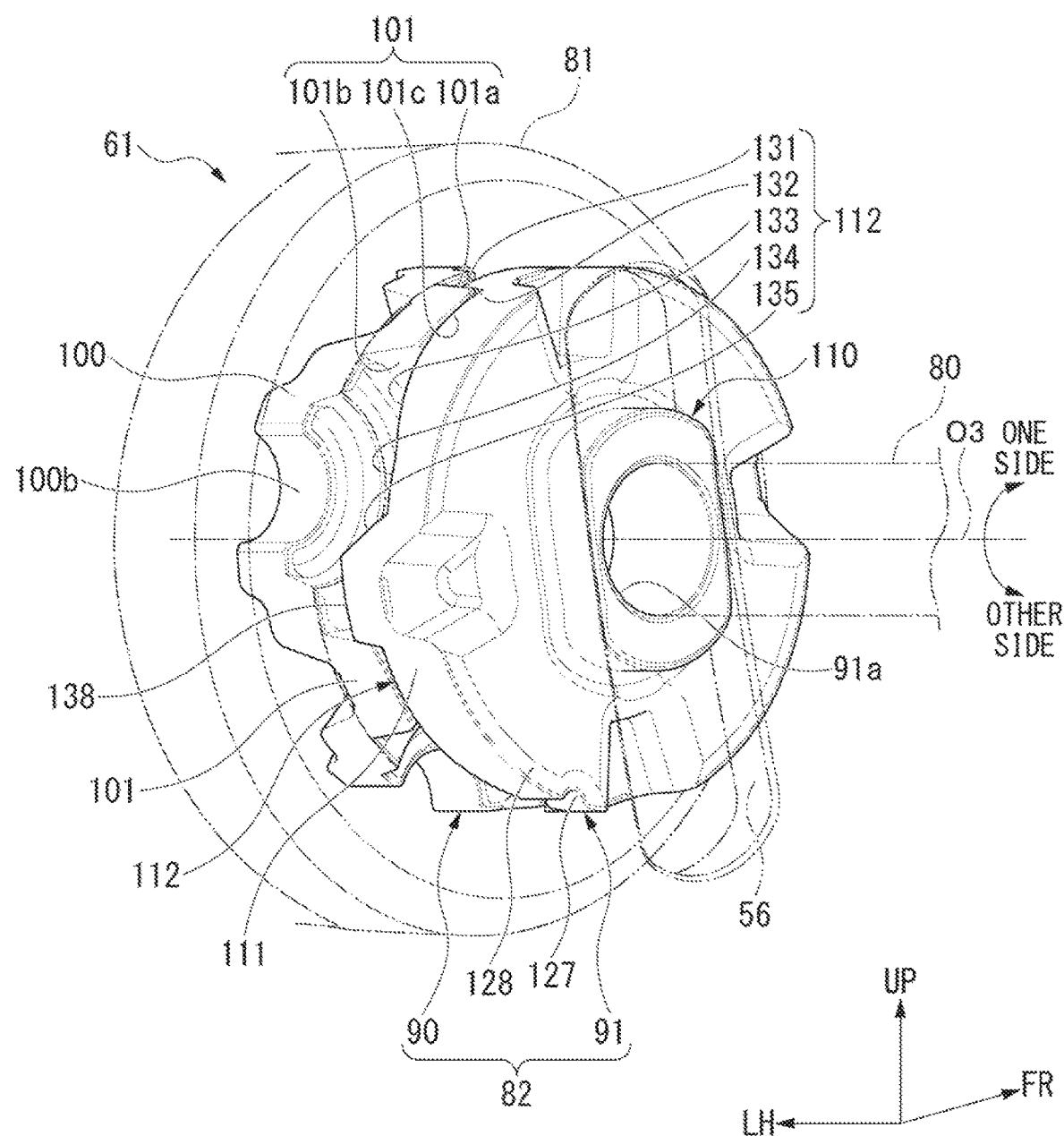
FIG. 5 is a perspective view of a cam mechanism.

FIG. 5 is a perspective view of the cam mechanism 82.

As shown in FIGS. 2 and 5, the cam mechanism 82 is disposed between the operation lever 81 and one of the rear side plate portions 54 (on the left side). The cam mechanism 82 is configured such that the thickness thereof in the right-left direction is changed as the operation lever 81 is rotated. The steering device 1 is configured such that the fastening portions 25 approach each other or are separated from each other in the right-left direction via the rear side plate portions 54 (a dimension of the slit 28 in the right-left direction is increased or decreased) when the thickness of the cam mechanism 82 is changed. Specifically, when the operation lever 81 is rotated such that the thickness of the cam mechanism 82 is increased, the fastening portions 25 approach each other together with the rear side plate portions 54 and thus the diameter of the holding tubular portion 24 is decreased. Accordingly, the inner column 22 is clamped by the holding tubular portion 24 and the telescopic operation and the tilting operation are restricted (a locked state). When the operation lever 81 is rotated in the locked state such that the thickness of the cam mechanism 82 is decreased, the fastening portions 25 are separated from each other together with the rear side plate portions 54 and thus the diameter of the holding tubular portion 24 is increased. Accordingly, the inner column 22 clamped by the holding tubular portion 24 is released and the telescopic operation and the tilting operation are allowed (an unlocked state).

<Cam Mechanism 82>

The cam mechanism 82 includes a drive cam 90 and a driven cam 91.

The drive cam 90 is integrally fixed to the base end portion of the operation lever 81 through, for example, insert molding. The drive cam 90 is made of a material having a hardness higher than the rear side plate portions 54 (for example, a sintered material or the like of tin iron-based material).

The drive cam 90 includes a drive base 100 and a plurality of cam portions 101.

The drive base 100 is formed in a disk-like shape disposed to be coaxial with the third axis O3. A passage hole 100a (refer to FIG. 2) that the lock boll 80 penetrates is formed in a central portion of the drive base 100 in the bolt radial direction. A plurality of recessed portions 100b are formed at an outer peripheral portion of the drive base 100. The recessed portions 100b penetrate the drive base 100 in the right-left direction and are open at an outer peripheral surface of the drive base 100. The plurality of recessed portions 100b are disposed at intervals in the bolt circumferential direction. The drive cam 90 is fixed to the operation lever 81 in a state where the drive base 100 is embedded in the base end portion of the operation lever 81.

Each cam portion 101 is provided on the outer peripheral portion of the drive base 100 at a portion positioned between adjacent recessed portions 100b. The cam portions 101 protrude toward the right side (a first side in the right-left direction) from the operation lever 81 in a case where the drive base 100 is embedded in the operation lever 81. Since the cam portions 101 have the same configurations as each other, one of the cam portions 101 will be described as an example in the following description.

The cam portion 101 is formed in a trapezoidal shape as seen in the bolt radial direction. A dimension of the cam portion 101 in the bolt circumferential direction gradually decreases from a base end side toward a tip end side (from the left side toward the right side). The cam portion 101 of the present embodiment is formed to be line-symmetrical in the bolt circumferential direction.

Figure 6:
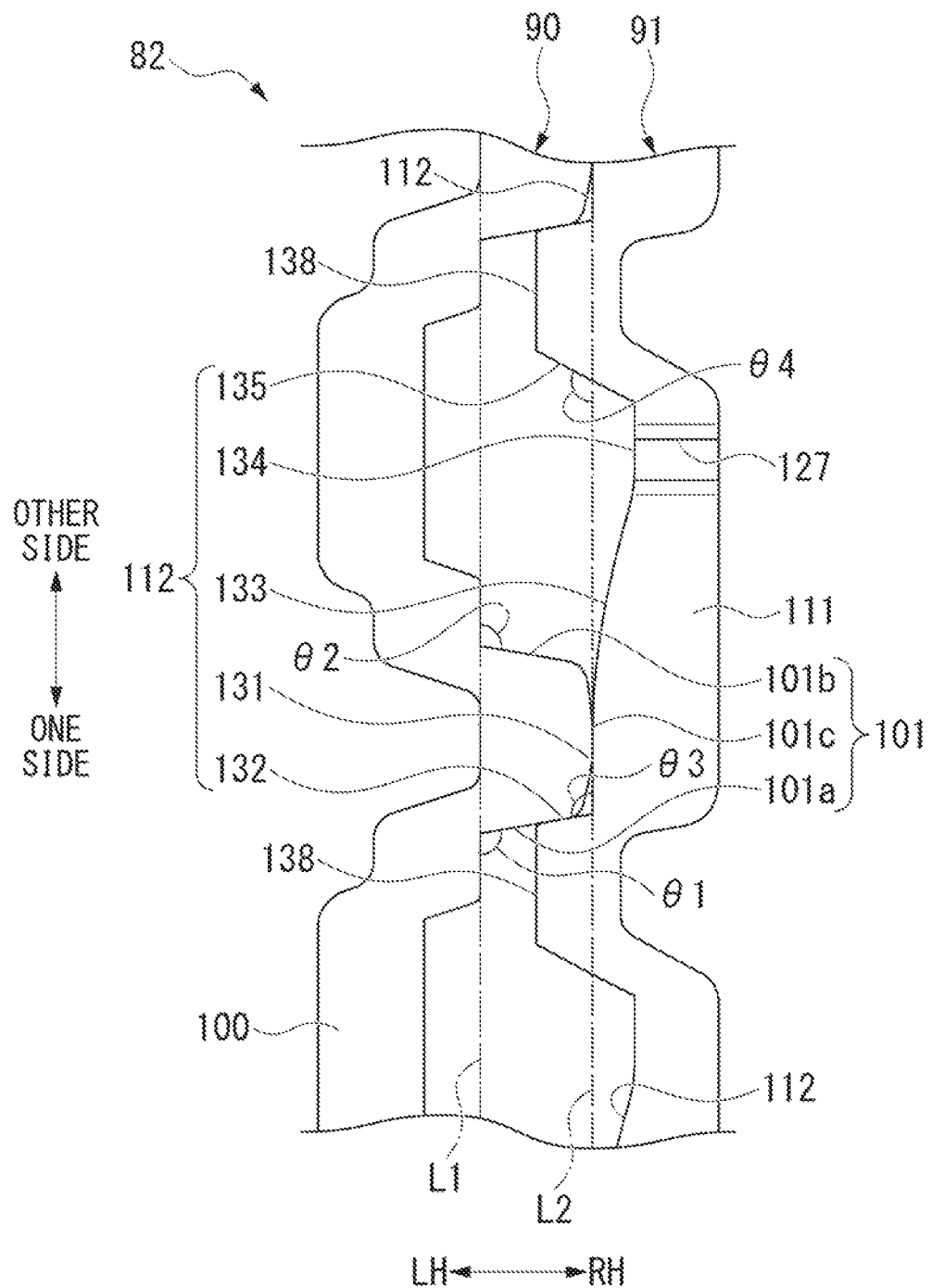
FIG. 6 is a net of the cam mechanism.

FIG. 6 is a net of the cam mechanism 82.

As shown in FIG. 6, as seen in the bolt radial direction, a peripheral surface of the cam portion 101 includes an engagement surface (a second side surface) 101a, a flank surface (a first side surface) 101b, and a sliding surface (a tip surface) 101c.

The engagement surface 101a is a surface as a portion of the peripheral surface of the cam portion 101 that faces one side (a first side) in the bolt circumferential direction. The engagement surface 101a is an inclined surface that is inclined with respect to a surface of the drive base 100 (a surface that faces the driven cam 91). Specifically, the engagement surface 101a extends to be closer to the other side (a second side) in the holt circumferential direction toward the tip end side of the cam portion 101. The angle of the engagement surface 101a with respect to a virtual line L1, which extends in the holt circumferential direction along the surface of the drive base 100, is set to be θ1. The angle θ1 of the engagement surface 101a may be a right angle or the like.

The flank surface 101b is an inclined surface that extends to be closer to the one side in the bolt circumferential direction toward the tip end side of the cam portion 101. An angle θ2 of the flank surface 101b with respect to the virtual line L1 is equivalent to the angle θ1 of the engagement surface 101a. The angles θ1 and θ2 may be different from each other.

The sliding surface 101c is laid between tip ends of the engagement surface 101a and the flank surface 101b. The sliding surface 101c is formed as a curved surface that is curved toward the right side (an arrow RH in FIG. 6). The sliding surface 101c may be connected to the engagement surface 101a and the flank surface 101b via a ridge (for example, a ridge portion P in FIG. 9) or via a curved surface.

As shown in FIG. 5, the driven cam 91 is disposed between the drive cam 90 and the rear side plate portion 54. A through hole 91a that penetrates the driven cam 91 in the right left direction is formed in the driven cam 91. The driven cam 91 is attached to the rear side plate portion 54 with the lock bolt 80 penetrating the driven cam 91 through the through-hole 91a. Therefore, the driven cam 91 rotates relative to the drive cam 90 when the operation lever 81 is rotated and thus the drive cam 90 rotates around the third axis O2 (in the bolt circumferential direction).

The driven earn 91 includes a holding portion 110, a driven base (base portion) 111, and a plurality of cam follower portions 112. The holding portion 110 is accommodated in the tilt guide hole 56. The holding portion 110 functions as a rotation stopping member that comes into contact with an inner peripheral edge of the tilt guide hole 56 to restrict the driven cam 91 from rotating with respect to the rear side plate portion 54 around third axis O3. The holding portion 110 is formed in an approximately oval shape of which the longitudinal direction is the vertical direction, as seen in the right-left direction. The through-hole 91a penetrates a central portion of the holding portion 110.

As shown in FIG. 4, an outer peripheral surface of the holding portion 110 includes a rise restriction surface 110a, a fall restriction surface 110b, a first rotation restriction surface 110c, and a second rotation restriction surface 110d.

The rise restriction surface 110a is a surface as a portion of the outer peripheral surface of the holding portion 110 that faces upward. The rise restriction surface 110a is formed as a curved surface that is curved upward. It is preferable that the radius of curvature of the rise restriction surface 110a is set to be the same as that, of an upper end opening edge of the tilt guide hole 56.

The fall restriction surface 110b is a surface as a portion of the outer peripheral surface of the holding portion 110 that faces downward. The fall restriction surface 110b is formed as a curved surface that is curved downward. It is preferable that the radius of curvature of the fall restriction surface 110b is set to be the same as that of a lower end opening edge of the tilt guide hole 56. The radius of curvature of each of the restriction surfaces 110a and 110b can be changed as appropriate.

The first rotation restriction surface 110c is laid between rear ends of the rise restriction surface 110a and the fall restriction surface 110b. The first rotation restriction surface 110c includes a first release contact portion 115 and a first lock contact portion 117.

The first release contact portion 115 constitutes an upper portion of the first rotation restriction surface 110c. The first release contact portion 115 is connected to a first end portion of the rise restriction surface 110a via a curved portion 118. The first release contact portion 115 is formed as a curved surface that is curved rearward. The radius of curvature of the first release contact portion 115 is larger than the radius of curvature of the first lock contact portion 117 and smaller than the radius of curvature of the tilt guide hole 56 (the radius of curvature R=about 32 mm). In an example shown in the drawing, the first release contact portion 115 is formed over a region extending by two thirds of the distance from an upper end of the first rotation restriction surface 110c.

The first lock contact portion 117 constitutes a lower portion of the first rotation restriction surface 110c. The first lock contact portion 117 is formed as a curved surface that protrudes rearward with respect to the first release contact portion 115. The radius of curvature of the first lock contact portion 117 is smaller than the radius of curvature of the fall restriction surface 110b. An upper end of the first lock contact portion 117 is connected to the first release contact portion 115. A lower end of the first lock contact portion 117 is smoothly connected to a front end of the fall restriction surface 110b. In the present embodiment, a configuration in which the first release contact portion 115 and the first lock contact portion 117 are directly connected to each other has been described. However, a flat surface may be interposed between the first release contact portion 115 and the first lock contact portion 117.

The second rotation restriction surface 110d is laid between front ends of the rise restriction surface 110a and the fall restriction surface 110b. The second rotation restriction surface 110d is formed at a position on the holding portion 110 such that the second rotation restriction surface 110d and the first rotation restriction surface 110c are point-symmetric with respect to the third axis O3. That is, the second rotation restriction surface 110d is formed by a second release contact portion 121 and a second lock contact portion 123 continuously extending in a direction from the lower side to the upper side. Therefore, regarding the holding portion 110, a pair of the release contact portions 115 and 121 facing the other side in the bolt circumferential direction is disposed such that the release contact portions 115 and 121 are at opposite corners with the third axis O3 interposed therebetween. Regarding the holding, portion 110, a pair of the lock contact portions 117 and 123 facing the one side in the boll circumferential direction is disposed such that the lock contact portions 117 and 123 are at the other opposite corners with the third axis O3 interposed therebetween.

As shown in FIG. 5, the driven base 111 continuously extends to the left side from the holding portion 110. The driven base 111 is disposed outside the tilt guide hole 56 and is disposed along an outer surface of the rear side plate portion 54. As seen in the right-left direction, the driven base 111 is formed in a disk like shape disposed to be coaxial with the third axis O3. The through-hole 91a penetrates a central portion of the driven base 111.

An indication portion 127 is formed at a portion in the bolt circumferential direction of an outer peripheral surface of the driven base 111. The indication portion 127 is used to determine the attachment orientation of the driven cam 91 to the rear side plate portion 54 in the vertical direction. The indication portion 127 is a groove that is open at the outer peripheral surface of the driven base 111 and penetrates the driven base 111 in the right-left direction. In the present embodiment, the indication portion 127 is formed at a portion of the outer peripheral surface of the driven base 111 that faces downward. The indication portion 127 may be formed at a portion of the outer peripheral surface of the driven base 111 that faces upward. The indication portion 127 is not limited to a groove as long as the indication portion 127 can be visually recognized in the bolt radial direction through a space between the operation lever 81 and the rear side plate portion 54. In this case, the indication portion 127 may be a color mark, for example.

A chamfered portion 128 is formed at least on a right peripheral edge portion of the outer peripheral surface of the driven base 111. The chamfered portion 128 is, for example, R-chamfered. However, the chamfered portion 128 may also be C-chamfered or the like.

As shown in FIGS. 5 and 6, the cam follower portions 112 are formed at positions on the driven base 111 that face the cam portions 101 in the right-left direction. The cam follower portions 112 are uneven surfaces that engage with the cam portions 101. The cam follower portions 112 are disposed at intervals in the bolt circumferential direction. Specifically, each cam follower portion 112 includes a ride-on surface 131, a lock position restriction surface 132, a transition surface 133, a passage surface 134, and a release position restriction surface 135.

The ride-on surface 131 extends in the bolt circumferential direction on the same plane as a surface of the driven base 111 (a surface that faces the drive cam 90). When the lock mechanism 61 is in a locked state, the sliding surface 101c abuts the ride-on surface 131 in the right-left direction.

The lock position restriction surface 132 continuously extends to the one side in the holt circumferential direction from the ride-on surface 131. The lock position restriction surface 132 extends toward the left side with respect to the ride on surface 131 (the surface of the driven base 111). The lock position restriction surface 132 faces the engagement surface 101a in the holt circumferential direction when the lock mechanism 61 is in the locked state. The lock position restriction surface 132 restricts the drive cam 90 from rotating toward the one side in the bolt circumferential direction with respect to the driven cam 91 with the engagement surface 101a abutting onto the lock position restriction surface 132 in the bolt circumferential direction. In the present embodiment, the lock position restriction surface 132 is an inclined surface, extending in imitation of the engagement surface 101a. That is, an angle θ3 of the lock position restriction surface 132 with respect to a virtual line L2, which extends along the surface of the driven base 111 and is parallel to the virtual line L1, is set to be the same as the angle θ1 of the engagement surface 101a. The angle θ3 of the lock position restriction surface 132 may be different from the angle θ1 of the engagement surface 101a.

The transition surface 133 continuously extends to the other side in the bolt circumferential direction from the ride-on surface 131. The transition surface 133 is formed as an inclined surface that extends to be closer to the right side toward the other side in the boll circumferential direction. In the present embodiment, the transition surface 133 is formed as a curved surface that is curved toward the left side. The sliding surface 101c slides on the transition surface 133 when the lock mechanism 61 transitions between the locked state and the unlocked state (refer to FIG. 8).

The passage surface 134 continuously extends to the other side in the bolt circumferential direction from the transition surface 133. The passage surface 134 is a flat surface extending linearly along the bolt circumferential direction.

The release position restriction surface 135 continuously extends to the other side in the bolt circumferential direction from the passage surface 134. The release position restriction surface 135 extends toward the left side with respect to the passage surface 134. Specifically, the release position restriction surface 135 is formed as an inclined surface that extends to be closer to the left side toward the other side in the bolt circumferential direction. An angle θ4 of the release position restriction surface 135 with respect to the virtual line L2 is larger than that of the transition surface 133 and is larger than the angle θ2 of the flank surface 101b and the angle θ3 of the lock position restriction surface 132. The release position restriction surface 135 is a sliding surface, on which the ridge portion (a boundary portion) P between the sliding surface 101c and the flank surface 101b slides in a state of being in line contact with the sliding surface when the lock mechanism 61 is in the unlocked state (refer to FIG. 9).

The release position restriction surface 135 of one of adjacent cam follower portions 112 and the lock position restriction surface 132 of the other of the adjacent cam follower portions 112 are connected to each other via a connection surface 138. The connection surface 138 is a flat surface extending in the bolt circumferential direction while being on the left side with respect to the driven base 111.

Next, the operation of the above-described steering device 1 will be described focusing on a method of operating the lock mechanism 61. In the following description, a suite where the steering device 1 is in the locked state will be referred to as an initial state.

In the locked state shown in FIG. 6, the transition surface 133 and the sliding surface 101c of the lock mechanism 6 abut onto each other in the right left direction with the lock position restriction surface 132 and the engagement surface 101a abutting onto each other in the bolt circumferential direction. Accordingly, movement of the drive cam 90 and the driven cam 91 toward the one side in the bolt circumferential direction and movement thereof in the right-left direction are restricted. As shown in FIG. 4, the driven cam 91 is restricted from rotating toward the one side in the bolt circumferential direction with respect to the rear side plate portion 54 with the lock contact portions 117 and 123 of the holding portion 110 abutting onto the inner peripheral edge of the tilt guide hole 56 in the bolt circumferential direction.

To cause the steering device 1 to enter the unlocked state in such a state, the operation lever 81 is to be pressed downward. As shown in FIG. 6, the drive cam 90 rotates together with the operation lever 81, toward the other side in the bolt circumferential direction with respect to the driven cam 91. Accordingly, the cam portion 101 moves to the other side in the bolt circumferential direction with respect to the driven cam 91.

Figure 7:
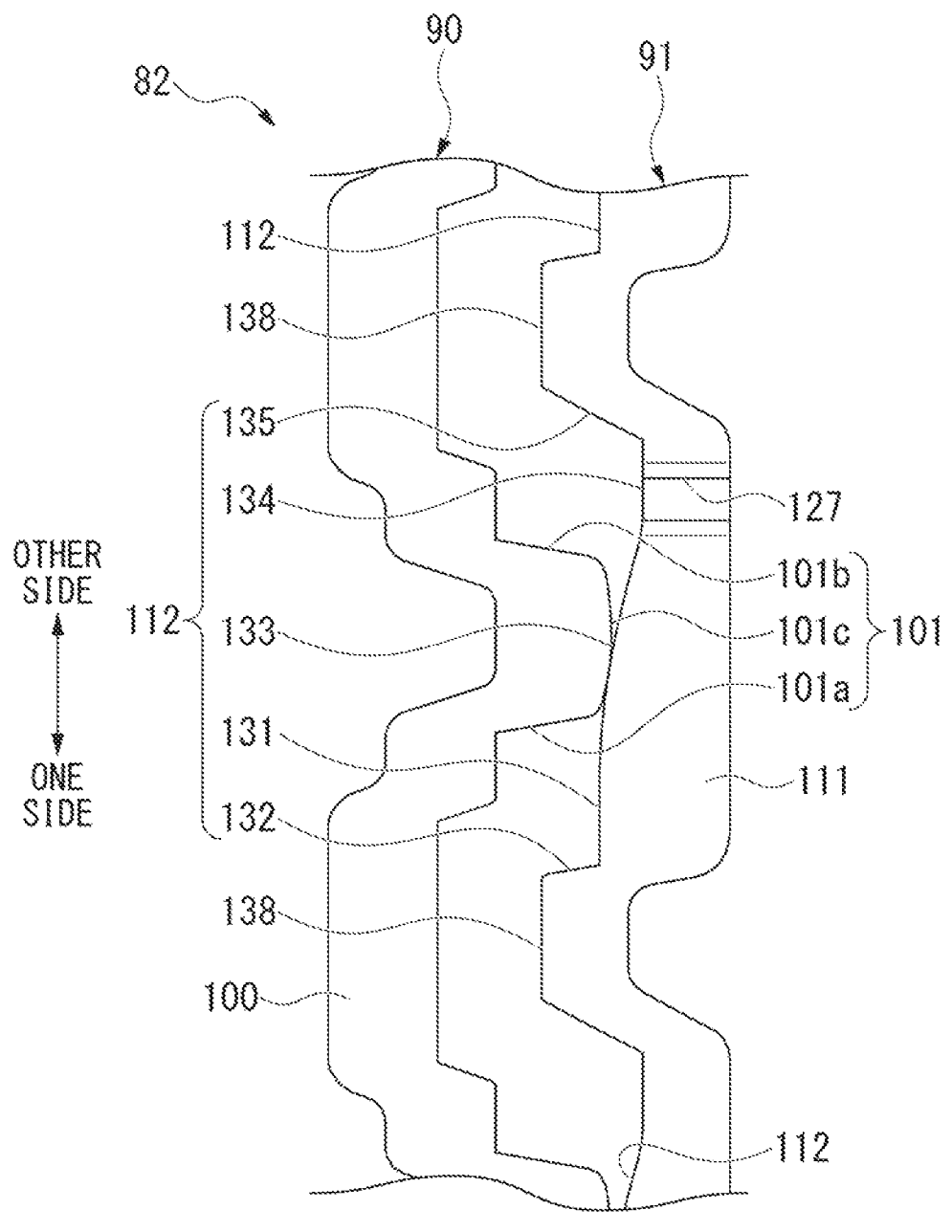
FIG. 7 is a view showing the operation of the steering device according to the embodiment.
Figure 8:
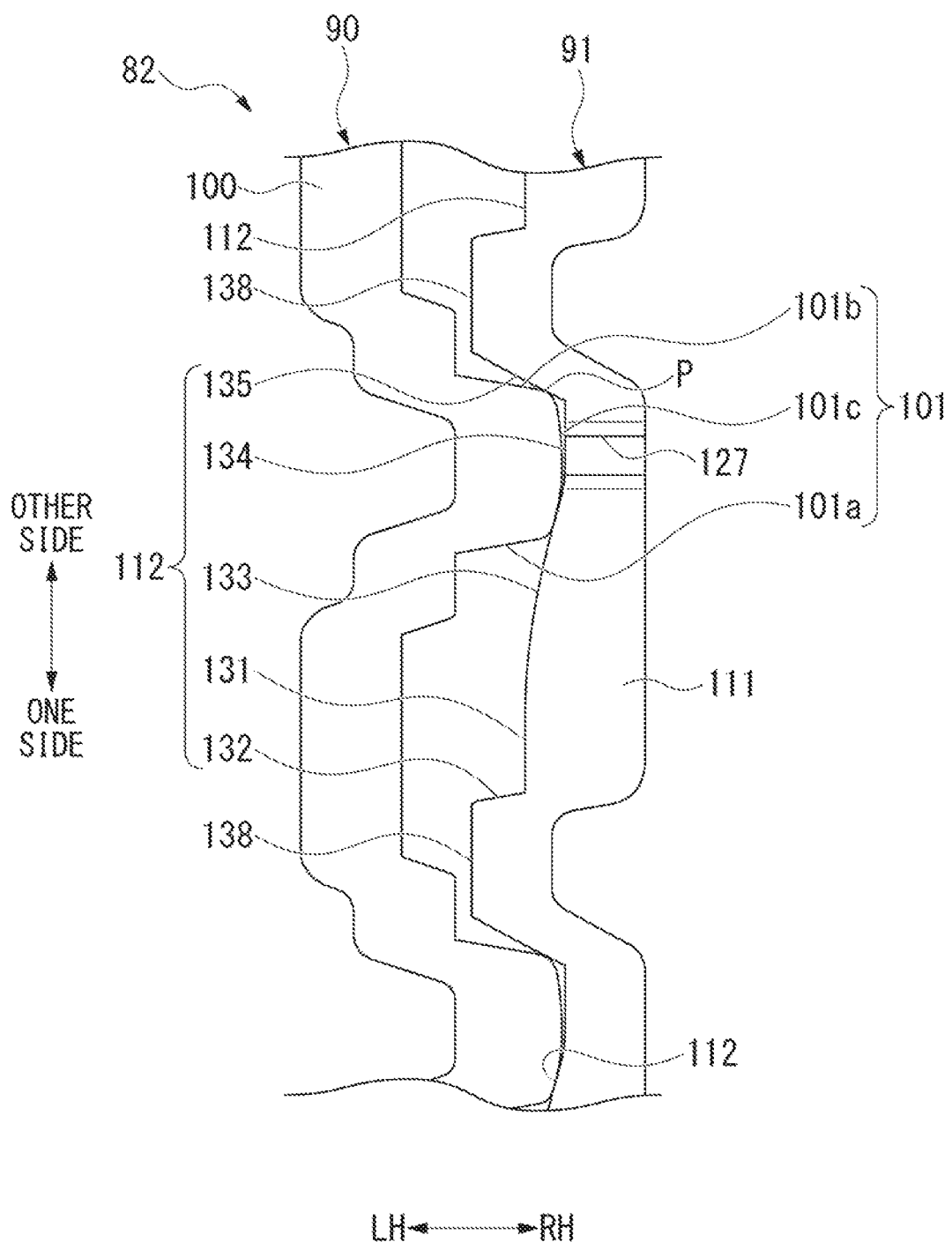
FIG. 8 is a view showing the operation of the steering device according to the embodiment.

As shown in FIGS. 6 and 7, during a transition from the locked state to the unlocked state, the cam portion 101 moves to the other side in the bolt circumferential direction with the sliding surface 101c sliding on the transition surface 133. Accordingly, the drive base 100 approaches the driven base 111 in the right left direction and the thickness of the cam mechanism 82 in the right-left direction is decreased. As a result, the fastening portions 25 are separated from each other together with the rear side plate portions 54 and thus the diameter of the holding tubular portion 24 is increased. Thereafter, as shown in FIG. 8, the cam portion 101 reaches the passage surface 134 and the thickness of the cam mechanism 82 becomes the minimum. In this state, the inner column 22 clamped by the holding tubular portion 24 is released and the telescopic operation and the tilting operation are allowed (the unlocked state is entered).

As shown in FIGS. 1 to 3, to change the telescopic position of the steering wheel 2 forward, the steering wheel 2 is to be pressed forward in the unlocked state. Then, the steering wheel 2 moves forward with respect to the outer column 21 together with the inner column 22 and the steering shaft 12. To change the telescopic position of the steering wheel 2 rearward, the steering wheel 2 is to be pulled in the unlocked state. Then, the steering wheel 2 moves rearward with respect, to the outer column 21 together with the inner column 22 and the steering shaft 12. Accordingly, it is possible to adjust the telescopic position of the steering wheel 2 at will.

To change the tilt position of the steering wheel 2 upward, the steering wheel 2 is to be pressed upward in the unlocked state. Then, the lock bolt 80 moves upward in the tilt guide holes 56 and thus the steering wheel 2 rotates upward in a direction around the second axis O2 together with the column unit 11 and the steering shaft 12.

To change the tilt position of the steering wheel 2 downward, the steering wheel 2 is to be pulled down in the unlocked state. Then, the lock bolt 80 moves downward in the tilt guide holes 56 and thus the steering wheel 2 rotates downward in the direction around the second axis O2 together with the column unit 11 and the steering shaft 12. Accordingly, it is possible to adjust the tilt position of the steering wheel 2 to any position.

Figure 10:
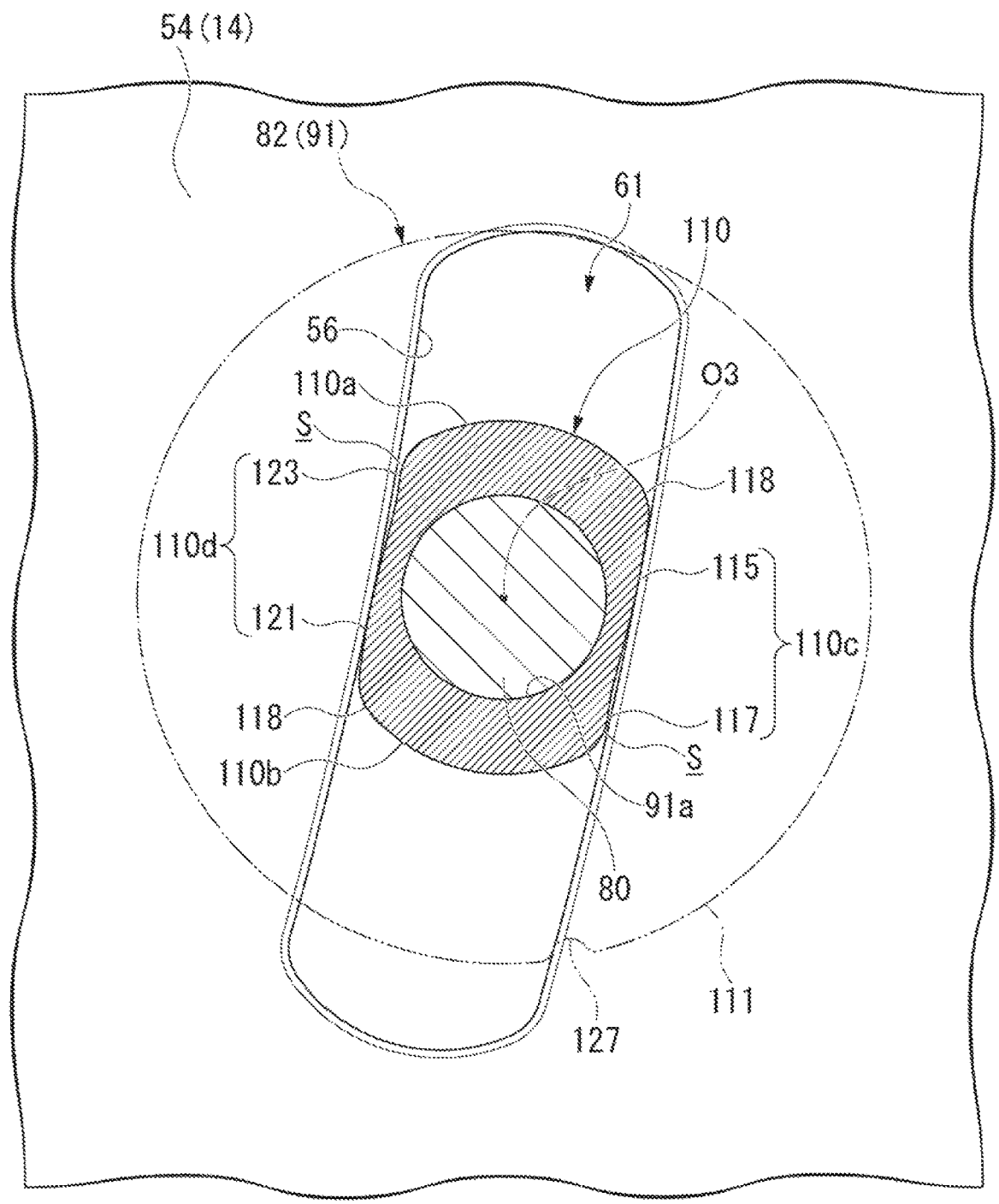
FIG. 10 is a view showing the operation of the steering device according to the embodiment.

Here, as shown in FIGS. 4 and 10, a gap S is provided between the outer peripheral surface of the holding portion 110 and the inner peripheral edge of the tilt guide hole 56, the gap S having such a size that the holding portion 110 can move in the tilt guide hole 56 in the vertical direction. Therefore, at the time of a transition between the locked state and the unlocked state, the holding portion 110 rotates in the bolt circumferential direction in the tilt guide hole 56 due to a frictional force or the like acting between the cam portions 101 and the cam follower portions 112. Specifically, at the time of a transition from the locked state to the unlocked state, the holding portion 110 rotates toward the other side in the bolt circumferential direction and thus the lock contact portions 117 and 123 are separated from the inner peripheral edge of the tilt guide hole 56 and the release contact portions 115 and 121 approach the inner peripheral edge of the tilt guide hole 56 or abut onto the inner peripheral edge of the tilt guide hole 56. Therefore, at the time of a change in tilt position, the release contact portions 115 and 121 may slide on the inner peripheral edge of the tilt guide hole 56.

Figure 9:
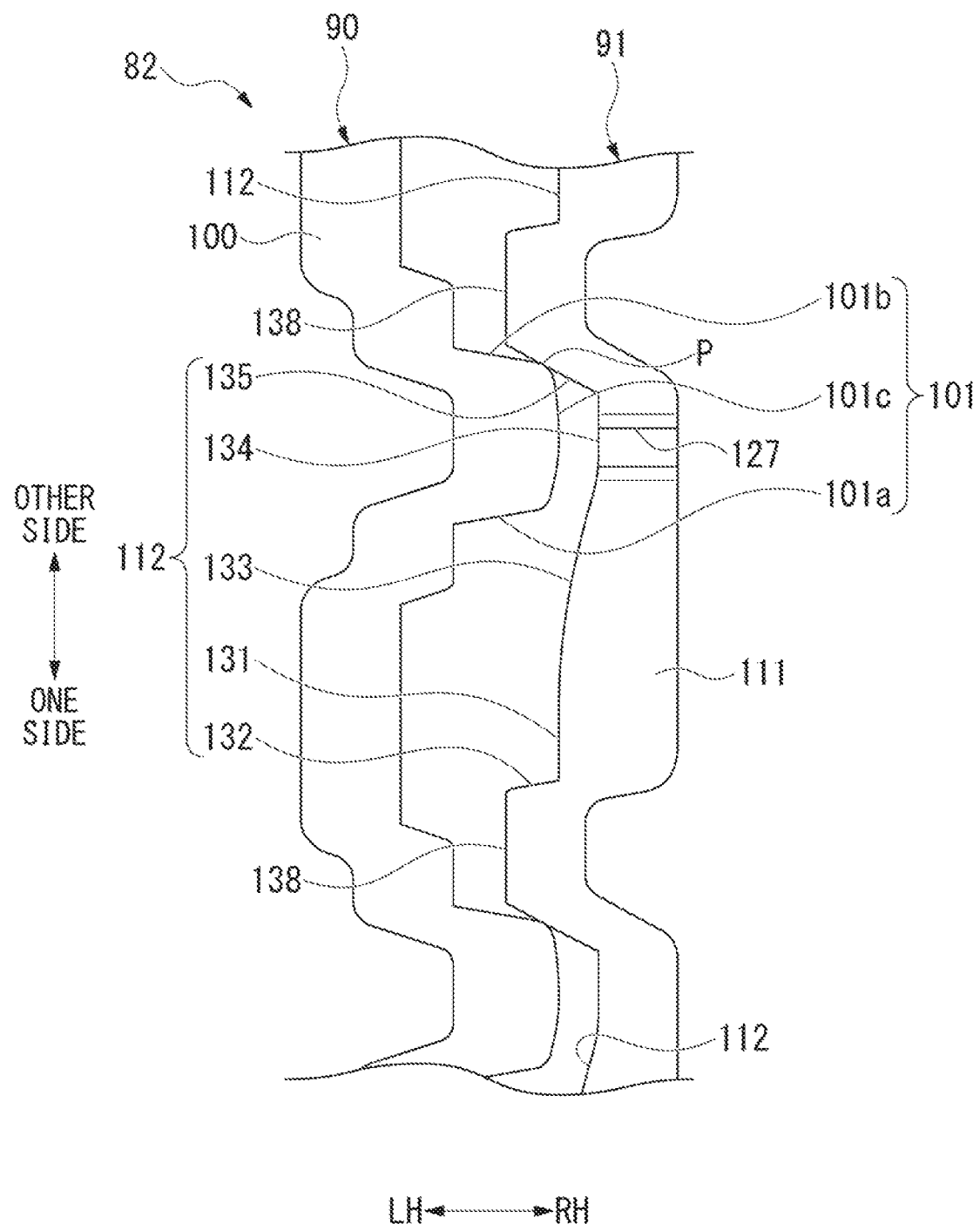
FIG. 9 is a view showing the operation of the steering device according to the embodiment.

As shown in FIGS. 8 and 9, there is a case where the operation lever 81 is further pressed down in a state where the cam portion 101 has reached the passage surface 134. In this case, the release position restriction surface 135 of the driven cam 91 is pressed by the earn portion 101 toward the other side in the bolt circumferential direction. As a result, the driven cam 91 is caused to rotate toward the other side in the circumferential direction and thus the holding portion 110 is pressed against the inner peripheral edge of the tilt guide hole 56. Accordingly, the holding portion 110 is pressed against the inner peripheral edge of the lilt guide hole 56 via the release contact portions 115 and 121.

In the present embodiment, the radius of curvature of each of the release contact portions 115 and 121 is larger than the radius of curvature of each of the lock contact portions 117 and 123 and smaller than the radius of curvature of the tilt guide hole 56. Therefore, a pressure (a surface pressure) acting between the release contact portions 115 and 121 and the inner peripheral edge of the tilt guide hole 56 is smaller than a surface pressure acting between the lock contact portions 117 and 123 and the inner peripheral edge of the tilt guide hole 56.

In the present embodiment, the angle θ4 of the release position restriction surface 135 is larger than the angle θ2 of the flank surface 101b. Therefore, in a case where the operation lever 81 is further pressed down in a state where the can) portion 101 and the passage surface 134 face each other, the flank surface 101b and the release position restriction surface 135 do not come into contact with each other and the ridge portion P of the cam portion 101 comes into line contact with the release position restriction surface 135. In addition, the ridge portion P of the cam portion 101 slides on the release position restriction surface 135 as the operation lever 81 is pressed down. Thereafter, the operation lever 81 is restricted from rotating toward the other side in the bolt circumferential direction when the cam portion 101 rises and reaches an intermediate position on the release position restriction surface 135. At a contact portion between the cam portion 101 (the ridge portion P) and the release position restriction surface 135, a load acting in the normal direction of the release position restriction surface 135 is decomposed into a component along the bolt circumferential direction and a component along the right left direction.

To cause the lock mechanism 61 to enter the locked suite again after adjustment of the telescopic position or the tilt position, the operation lever 81 is to be pulled up (rotated to the one side in the bolt circumferential direction). Then, a transition into the locked state is made via an operation contrary to the above-described operation. That is, as the operation lever 81 rotates, the cam portion 101 moves toward the one side in the bolt circumferential direction with respect to the driven cam 91. Then, the cam portion 101 reaches the ride-on surface 131 via the passage surface 134 and the transition surface 133 after sliding on the release position restriction surface 135. In addition, the drive base 100 is gradually separated from the driven base 111 while the cam portion 101 is sliding on the transition surface 133 toward the one side in the bolt circumferential direction. As a result, the thickness of the cam mechanism 82 gradually increases. Accordingly, the inner column 22 is clamped by the holding tubular portion 24 and the telescopic operation and the tilting operation are restricted (a locked state). When the engagement surface 101a of the cam portion 101 abuts the lock position restriction surface 132, the drive cam 90 is restricted from rotating toward the one side in the bolt circumferential direction with respect to the driven cam 91.

When the operation lever 81 is further pulled up after the engagement surface 101a of the cam portion 101 abuts the lock position restriction surface 132 in the bolt circumferential direction, the drive cam 90 and the driven cam 91 are integrally rotated toward the one side in the bolt circumferential direction. In addition, in the locked state, the lock contact portions 117 and 123 of the holding portion 110 are pressed against an inner peripheral surface of the tilt guide hole 56 and thus the operation lever 8J is restricted from rotating around the third axis O3. At this time, the radius of curvature of each of the lock contact portions 117 and 123 is smaller than the radius of curvature of each of the release contact portions 115 and 121. Therefore, a surface pressure acting between the lock contact portions 117 and 123 and the inner peripheral edge of the tilt guide hole 56 is larger than a surface pressure acting between the release contact port ions 115 and 121 and the inner peripheral edge of the tilt guide hole 56. Accordingly, it is possible to secure a frictional force acting between the lock contact portions 117 and 123 and the inner peripheral edge of the tilt guide hole 56 in the locked state and thus it is possible to suppress unexpected vertical movement of the column unit 11.

As described above, in the present embodiment, the driven cam 91 includes the lock position restriction surface 132 with which the cam portion 101 of the drive cam 90 engages in the locked state and the release position restriction surface 135 that is provided to be separated from the lock position restriction surface 132 in the bolt circumferential direction and that engages with the drive cam 90 in the bolt circumferential direction in the unlocked state. The cam portion 101 includes the sliding surface 101c that faces the driven cam 91 in the unlocked state and the (lank surface 101b that faces the release position restriction surface 135 in the bolt circumferential direction.

According to this configuration, during a transition from the locked state to the unlocked state of the lock mechanism 61, the holding portion 110 is caused to rotate by an amount corresponding to the gap S between the inner peripheral edge of the tilt guide hole 56 and the outer peripheral surface of the holding portion 110. Accordingly, the holding portion 110 is pressed against the inner peripheral edge of the tilt guide hide 56 via the release contact portions 115 and 121.

Therefore, in the present embodiment, a configuration in which the angle θ2 of the flank surface 101b with respect to the bolt circumferential direction is smaller than the angle θ4 of the release position restriction surface 135 with respect to the bolt circumferential direction is adopted. Accordingly, the ridge portion P between the sliding surface 101c and the flank surface 101b of the cam portion 101 is likely to come into line contact with the release position restriction surface 135 in the unlocked state. Accordingly, manufacturing variability is less likely to exert an influence in comparison with a case where the cam portion 101 and the release position restriction surface 135 are caused to come into surface contact with each other in the bolt circumferential direction. Therefore, a load acting between the cam portion 101 and the release position restriction surface 135 can be stabilized.

Furthermore, in the ease of the steering device 1 of the present embodiment, the angle θ4 of the release position restriction surface 135 with respect to the bolt circumferential direction can be made larger in comparison with a case where the cam portion 101 and the release position restriction surface 135 are caused to come into surface contact with each other. Therefore, in the case of the steering device 1 of the present embodiment, a load component in the boll circumferential direction, which is a part of a load acting in the normal direction of the release position restriction surface 135 at a contact portion between the ridge portion P and the release position restriction surface 135, can be made small (a load component in the right-left direction can be made large). As a result, in the case of the steering device 1 of the present embodiment, a surface pressure acting between the release contact portions 115 and 121 and the inner peripheral edge of the tilt guide hole 56 can be stabilized and thus it is possible to suppress an impression or the like formed on the inner peripheral edge of the tilt guide hole 56. Accordingly, in the case of the steering device 1 of the present embodiment, generation of an abnormal noise or a sense of wrongness felt by a user can be reduced even in a case where the holding portion 110 slides on the inner peripheral edge of the tilt guide hole 56 at the time of a change in tilt position. Therefore, it is possible to provide a favorable operational feeling to a user.

In the present embodiment, the cam portion 101 is configured to be rideable on the release position restriction surface 135 in the unlocked state.

According to this configuration, the position of contact between the release position restriction surface 135 and the ridge portion P can be stabilized in the unlocked state. Therefore, in the case of the steering device 1 of the present embodiment, wobbling between the drive cam 90 and the driven cam 91 in the unlocked state can be suppressed.

In the present embodiment, the engagement surface 101a of the cam portion 101 abuts the lock position restriction surface 132 in the locked state.

According to this configuration, a load component in the bolt circumferential direction, which is a part of a load acting in the normal direction of the lock position restriction surface 132 at a contact portion between the engagement surface 101a and the lock position restriction surface 132 in the locked state, can be made large. As a result, in the case of the steering device 1 of the present embodiment, the lock contact portions 117 and 123 can be reliably pressed against the inner peripheral edge of the tilt guide hole 56. Accordingly, in the case of the steering device 1 of the present embodiment, it is possible to secure a frictional force acting between the lock contact portions 117 and 123 and the inner peripheral edge of the tilt guide hole 56 in the locked state and thus it is possible to suppress unexpected vertical movement of the column unit 11.

In the steering device 1 of the present embodiment, the indication portion 127 is provided at the outer peripheral surface of the driven base 111.

According to this configuration, the attachment orientation of the driven cam 91 can be easily made the same between the steering devices 1. Therefore, in the case of the steering device 1 of the present embodiment, it is possible to restrain conditions of contact between the holding portion 110 (the release contact portions 115 and 121 and the lock contact portions 117 and 123) and the inner peripheral edge of the tilt guide hole 56 from being different between the steering devices 1 due to manufacturing variability of the driven cam 91. As a result, it is possible to suppress variation in performance of the lock mechanism 61.

In the steering device 1 of the present, embodiment, the chamfered portion 128 is formed at a peripheral edge portion of the driven base 111.

According to this configuration, tor example, even in a case where an axis of the driven cam 91 becomes inclined with respect to the third axis O3 due to the weight of the operation lever 81, a surface pressure acting between the peripheral edge portion of the driven base 111 and an outer surface of the rear side plate portion 54 can be reduced. Accordingly, in the case of the steering device 1 of the present embodiment, even in a case where the driven base 111 slides on the outer surface of the rear side plate portion 54 during adjustment of the tilt position or the like, a sense of wrongness felt by a user can be reduced.

Although preferable examples of the present disclosure have been described above, the present disclosure is not limited to the examples. Configurations may be added, omitted, replaced, or modified without departing from the gist of the present disclosure. The present disclosure is not limited by the above description, but only by the appended claims.

For example, in the above described embodiment, a configuration in which the first axis O1 intersects the front-near direction has been described. However, the present disclosure is not limited to this thereto. The first axis O1 may coincide with the front-rear direction of the vehicle.

In the above-described embodiment, a configuration in which one pair of release contact portions 115 and 121 and one pair of lock contact portions 117 and 125 are provided at the holding portion 110 such that the release contact portions 115 and 121 are provided at opposite corners with the third axis O3 interposed therebetween and the lock contact portions 117 and 123 are provided at opposite corners with the third axis O3 interposed therebetween has been described. However, the present disclosure is not limited thereto. It is sufficient that at least one of the release contact portions 115 and 121 is provided and at least one of the lock contact portions 117 and 123 is provided.

In the above-described embodiment, a configuration in which a transition from the unlocked state to the locked state is made when the operation lever 81 is pulled up (a so-called pull lock type) has been described. However, a configuration in which a transition from the unlocked state to the locked stale is made when the operation lever 81 is pressed down (a so-called press lock type) may also be adopted. In this case, on the same rotation restriction surface (for example, the first rotation restriction surface 110c), a release contact portion (for example, the first release contact portion 115) and a lock contact portion (for example, the first lock contact portion 117) are disposed at positions contrary to the pull lock type.

In the above-described embodiment, a configuration in which the cam portion 101 (the other member) has a protruding shape and the cam follower portion (one member) 112 has an uneven surface on which the cam portion 101 slides has been described. However, the present disclosure is not limited thereto. That is, the cam follower portion (the other member) 112 may have a protruding shape and the cam portion (one member) 101 may be an uneven surface on which the cam follower portion 112 slides.

Although the steering device 1 of the above-described embodiment has been described as having both a telescopic function and a tilt function, it is sufficient that the steering device 1 has at least a tilt function.

In the above-described embodiment a configuration in which the column unit 11 has a tubular shape has been described. However, the present disclosure is not limited thereto. It is sufficient that the column unit 11 rotatably holds the steering shaft 12.

In the above-described embodiment, a case where the movement of the inner column 22 is restricted or allowed by an increase or decrease in size of a gap formed by the slit 28 has been described. However, the present disclosure is not limited thereto.

In the above-described embodiment, a configuration in which the holding portion 110 includes the release contact portions 115 and 121 and the lock contact portions 117 and 123 which are different from each other in shape has been described. However, the present disclosure is not limited thereto. The release contact portions 115 and 121 and the lock contact portions 117 and 123 may have the same shape as each other. In this case, the holding portion 110 may be formed in a rectangular shape or an oval shape of which an outer shape is uniform.

In the above-described embodiment, a configuration in which the cam portion 101 rides on the release position restriction surface 135 in the unlocked state has been described. However, the present disclosure is not limited thereto. The cam portion 101 may not be configured to ride on the release position restriction surface 135 as long as the ridge portion P comes into contact with the release position restriction surface 135.

While preferred embodiments of the invention have been described and illustrated above, it should be understood that these are exemplary examples of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

EXPLANATION OF REFERENCES

1: steering device
11: column unit
12: steering shaft
13: front bracket
14: rear bracket
54: rear side plate portion (side plate portion)
56: tilt guide hole
61: lock mechanism
80: lock bolt (rod)
90: drive cam
91: driven earn
101: cam portion (other member, one member)
101a: engagement surface (second side surface)
101b: flank surface (first side surface)
101c: sliding surface (top surface)
110: holding portion
111: driven base (base portion)
112: cam follower portion (one member, other member)
127: indication portion
152: lock position restriction surface
135: release position restriction surface
O1: first axis
O2: second axis
O3: third axis

What is claimed is:
1. A steering device comprising:
a column unit configured to support a steering shaft such that the steering shaft is rotatable around a first axis extending along a front-rear direction;
a front bracket that is attached to a vehicle body in a state of supporting the column unit such that the column unit is rotatable around a second axis extending along a right-left direction;
a rear bracket that includes side plate portions and is attached to the vehicle body behind the front bracket, the side plate portions being positioned on both sides in the right-left direction with respect to the column unit and being provided with tilt guide holes each extending in an arc shape centered on the second axis; and a lock mechanism configured to switch between a locked state in which the column unit is restricted from moving around the second axis with respect to the front bracket and an unlocked state in which the column unit is allowed to move around the second axis with respect to the front bracket, wherein the lock mechanism includes
- a rod that is supported by the column unit so as to be rotatable around a third axis extending along the right-left direction in a state of penetrating the column unit and the tilt guide holes in the right-left direction,
- a drive cam that includes a cam portion and is fixed to the rod, and
- a driven cam that includes a holding portion held in the tilt guide hole and a cam follower portion facing the cam portion in the right-left direction outside the tilt guide hole and sliding on the cam portion as the rod rotates, one of the cam portion and the cam follower portion includes
- a lock position restriction surface that engages with the other of the cam portion and the cam follower portion in the locked state, and
- a release position restriction surface that is provided to be separated from the lock position restriction surface in a circumferential direction around the third axis and engages with the other of the cam portion and the cam follower portion in the unlocked state, the release position restriction surface is an inclined surface that extends to be closer to the other of the cam portion and the cam follower portion in the right-left direction as the inclined surface extends away from the lock position restriction surface in the circumferential direction, the other of the cam portion and the cam follower portion includes
- a top surface that faces the one of the cam portion and the cam follower portion in the right left direction, and
- a first side surface that is connected to the top surface and faces the release position restriction surface in the circumferential direction, and an angle of the first side surface with respect to the circumferential direction is smaller than an angle of the release position restriction surface with respect to the circumferential direction.

2. The steering device according to claim 1, wherein the other of the cam portion and the cam follower portion is configured to be rideable on the release position restriction surface in the unlocked state.

3. The steering device according to claim 2,
wherein the lock position restriction surface is an inclined surface that extends to be closer to the other of the cam portion and the cam follower portion in the right-left direction as the inclined surface extends away from the release position restriction surface in the circumferential direction and of which an angle with respect to the circumferential direction is smaller than that of the release position restriction surface, and the other of the cam portion and the cam follower portion includes a second side surface that is connected to the top surface and abuts the lock position restriction surface in the locked state.

4. The steering device according to claim 2,
wherein the driven cam includes a base portion that is positioned outside the tilt guide hole and on which the earn follower portion is formed, and an indication portion used to determine an attachment orientation of the holding portion around the third axis is provided at a portion of the base portion in the circumferential direction.

5. The steering device according to claim 1,
wherein the lock position restriction surface is an inclined surface that extends to be closer to the other of the cam portion and the earn follower portion in the right-left direction as the inclined surface extends away front the release position restriction surface in the circumferential direction and of which an angle with respect to the circumferential direction is smaller than that of the release position restriction surface, and the other of the cam portion and the cam follower portion includes a second side surface that is connected to the top surface and abuts the lock position restriction surface in the locked state.

6. The steering device according to claim 5,
wherein the driven cam includes a base portion that is positioned outside the tilt guide hole and on which the cam follower portion is formed, and an indication portion used to determine an attachment orientation of the holding portion around the third axis is provided at a portion of the base portion in the circumferential direction.

7. The steering device according to claim 1,
wherein the driven cam includes a base portion that is positional outside the tilt guide hole and on which the cam follower portion is formed, and an indication portion used to determine an attachment orientation of the holding portion around the third axis is provided at a portion of the base portion in the circumferential direction.

* * * * *